(12) United States Patent
Jolic et al.

(10) Patent No.: US 11,331,937 B2
(45) Date of Patent: May 17, 2022

(54) MICRO-IMAGERY DESIGN INTEGRATION

(71) Applicant: CCL Secure Pty Ltd, Craigieburn (AU)

(72) Inventors: Karlo Ivan Jolic, Craigieburn (AU); Darren Phillips, Craigieburn (AU); Gary Fairless Power, Craigieburn (AU)

(73) Assignee: CCL SECURE PTY LTD, Craigieburn (AU)

( * ) Notice: Subject to any disclaimer, the term of this patent is extended or adjusted under 35 U.S.C. 154(b) by 0 days.

(21) Appl. No.: 16/994,253

(22) Filed: Aug. 14, 2020

(65) Prior Publication Data
US 2020/0376876 A1 Dec. 3, 2020

Related U.S. Application Data

(63) Continuation-in-part of application No. PCT/AU2019/050141, filed on Feb. 21, 2019.

(30) Foreign Application Priority Data

Feb. 21, 2018 (AU) .................................. 2018100225

(51) Int. Cl.
*B42D 25/324* (2014.01)
*B42D 25/342* (2014.01)
(Continued)

(52) U.S. Cl.
CPC ........... *B41M 3/148* (2013.01); *B42D 25/324* (2014.10); *B42D 25/342* (2014.10); *B42D 25/351* (2014.10); *G02B 3/005* (2013.01)

(58) Field of Classification Search
CPC ........................... B42D 25/324; B42D 25/342
See application file for complete search history.

(56) References Cited

U.S. PATENT DOCUMENTS

| 6,016,225 A | * | 1/2000 | Anderson | ............ B42D 25/328 |
| | | | | 359/619 |
| 2013/0038942 A1 | * | 2/2013 | Holmes | ................ B42D 25/351 |
| | | | | 359/619 |

(Continued)

FOREIGN PATENT DOCUMENTS

| AU | 2017100907 B4 | 8/2017 | |
| DE | 102013010941 A1 | * 12/2014 | ............. B42D 25/29 |

(Continued)

OTHER PUBLICATIONS

PCT International Preliminary Report on Patentability, PCT Application No. PCT/AU2019/050141, dated Feb. 27, 2020, four pages.

(Continued)

*Primary Examiner* — Kyle R Grabowski
(74) *Attorney, Agent, or Firm* — Fenwick & West LLP

(57) ABSTRACT

A security element formed on a substrate having a printing side and a viewing side is provided, the security element including: a first image portion provided on the printing side of the substrate, the first image portion including one or more micro-image elements; a second image portion provided on the printing side and/or the viewing side of the substrate; and a plurality of focussing elements disposed on or in the viewing side of the substrate for observing the one or more micro-image elements; wherein the first image portion and the second image portion are integrated into at least one distinguishable security element when observed from the viewing side of the substrate.

28 Claims, 9 Drawing Sheets

(51) Int. Cl.
  *B41M 3/14* (2006.01)
  *B42D 25/351* (2014.01)
  *G02B 3/00* (2006.01)

(56) References Cited

U.S. PATENT DOCUMENTS

| | | | |
|---|---|---|---|
| 2013/0050818 A1* | 2/2013 | Holmes | G07D 7/003 |
| | | | 359/463 |
| 2013/0056971 A1* | 3/2013 | Holmes | B42D 25/351 |
| | | | 283/74 |
| 2018/0021668 A1* | 1/2018 | Finnerty | B42D 25/27 |
| | | | 283/101 |
| 2018/0196980 A1* | 7/2018 | Holmes | B42D 25/425 |
| 2018/0304669 A1* | 10/2018 | Godfrey | B42D 25/378 |
| 2018/0361777 A1* | 12/2018 | Fuhse | B42D 25/351 |
| 2019/0232708 A1* | 8/2019 | Holmes | B42D 25/47 |
| 2020/0384792 A1* | 12/2020 | Thony | B42D 25/309 |

FOREIGN PATENT DOCUMENTS

| | | | |
|---|---|---|---|
| WO | WO 2005/052650 A2 | 6/2005 | |
| WO | WO 2005/106601 A2 | 11/2005 | |
| WO | WO 2011/051668 A1 | 5/2011 | |
| WO | WO 2011/107783 A1 | 9/2011 | |
| WO | WO 2011/107791 A1 | 9/2011 | |
| WO | WO 2012/024718 A1 | 3/2012 | |
| WO | WO 2012/027779 A1 | 3/2012 | |
| WO | WO-2013098513 A1 * | 7/2013 | ............ B41M 3/148 |
| WO | WO 2013/167887 A1 | 11/2013 | |
| WO | WO 2017/055827 A2 | 4/2017 | |
| WO | WO 2018/011546 A1 | 1/2018 | |

OTHER PUBLICATIONS

Swedish Patent and Registration Office, Office Action, SE Patent Application No. 2051090-5, dated May 19, 2021, ten pages.

* cited by examiner

MICRO-IMAGERY DESIGN INTEGRATION

CROSS-REFERENCE TO RELATED APPLICATIONS

This application is a bypass continuation-in-part application of PCT International Application No. PCT/AU2019/050141 filed on Feb. 21, 2019, which claims priority to Australian Patent Application No. 2018100225 filed on Feb. 21, 2018, which are incorporated by reference herein in their entirety.

TECHNICAL FIELD

The present invention relates to improved methods for producing a security feature and a security document including a security element formed on a substrate.

BACKGROUND OF INVENTION

Security devices are applied to security documents or similar articles, such as identity cards, passports, credit cards, bank notes, cheques and the like and may take the form of diffraction gratings and similar optically detectable microstructures. Such security devices are difficult to falsify or modify, and are easily damaged or destroyed by any attempts to tamper with the document. Some of these security devices include focussing elements, such as micro lenses, which act to sample and magnify image elements and project imagery which is observable to a user for authentication purposes.

For example, optically variable imagery security features may be achieved by applying micro-image elements underneath an array of lenticular lenses, usually in their focal plane, or substantially close to it. The micro-image elements are typically applied to the substrate using rotary print methods such as flexo-printing, offset printing or gravure printing. The micro lenses used in security documents, such as bank notes, must be very small in order to maintain the desired thinness of the document, and maintain a small focal length, i.e. to enable the micro lenses to focus on micro-imagery deployed within their focal plane.

A disadvantage of these printing methods is that portions of the image elements may suffer from printing defects such as feathering, which is characterised by irregularities in the ink distribution, particularly at the edges of the printed area, making the edges appear ragged or "feathered." Feathering is a distortion typically associated with rotary printing processes such as gravure, and may be caused by one or more of a number of factors. For example, more of the ink drying than was expected on the printing drum before it is applied to a printing surface, e.g. the substrate, by the gravure cells not taking up the ink as expected, or the ink not being transferred from the gravure cells to the printing surface as expected. Typically, such distortions will affect the leading edge of the image element.

It would be desirable to provide a method for producing a complex micro-optic device which is difficult to counterfeit and at the same can be produced whilst minimising print distortions due to feathering and the like.

SUMMARY

According to an aspect of embodiments, there is provided a security element formed on a substrate having a printing side and a viewing side, the security element including a first image portion provided on the printing side of the substrate, the first image portion including one or more micro-image elements; a second image portion provided on the printing side and/or the viewing side of the substrate; and a plurality of focussing elements disposed on or in the viewing side of the substrate for observing the one or more micro-image elements; wherein the first image portion and the second image portion are integrated into at least one distinguishable security element when observed from the viewing side of the substrate.

The first image portion includes one or more micro-image elements, whilst in certain embodiments; the second image portion includes at least one opacifying element and/or at least one design element. An opacifying element may comprise a contiguous block of an opacifying layer, generally ink, applied to the substrate. A design element may comprise a portion of ink provided on the substrate such that it is discernible as an image or a graphic.

The first and second image portions are preferably printed in a first colour.

In some embodiments, the second image portion is provided on the printing side of the substrate and at least part of the second image portion is printed over at least part of the first image portion.

At least part of the first image portion may be provided in a window being a transparent or translucent area in the security document compared to the substantially opaque region to which printing is applied.

In other embodiments, the second image portion is provided on the printing side of the substrate and the second image portion is provided substantially adjacent to the first image portion. The second image portion may be printed before the first image portion.

At least one of the first image portion or the second image portion may be overprinted with a second colour.

The first image portion and the second image portion may be provided on the substrate such that they overlap in at least one region. A tonal gradient may be applied to the region in which the first image portion and the second image portion overlap.

In some embodiments, the first image portion and the second image portion form a first image layer and the security element further includes a second image layer including a third image portion and a fourth image portion, wherein the third image portion includes one or more micro-image elements.

The third image portion and the fourth image portion may be integrated into at least one second distinguishable security element when observed from the viewing side of the substrate.

In a particular form of the invention, the fourth image portion includes at least one opacifying element and/or at least one design element.

In some embodiments, the third and fourth image portions may be printed in a second colour.

At least part of the fourth image portion may be printed over at least part of the third image portion.

In some embodiments, at least part of the third image portion is provided in a window.

In a particular form of the invention, the fourth image portion is provided substantially adjacent to the third image portion.

The fourth image portion may be printed before the third image portion.

At least one of the third image portion or the fourth image portion may be overprinted with a third colour.

In some embodiments, the third image portion and the fourth image portion are provided on the substrate such that they overlap in at least one region. A tonal gradient may be applied to the region in which the third image portion and the fourth image portion overlap.

In a particular form of the invention, the first image portion, the second image portion, the third image portion and the fourth image portion are integrated into at least one third distinguishable security element when observed from the viewing side of the substrate.

In some embodiments, the first and second colours are contrasting.

In other embodiments, the first, second and third colours are contrasting.

In certain embodiments of the invention, the micro-image elements when viewed from the viewing side through the plurality of focussing elements, implement one or more of a contrast switch; an image flip; an animation; a magnified moiré image; an integral image; or an interlaced image.

In certain embodiments, the plurality of focusing elements includes micro lenses. The micro lenses may be arranged in a one dimensional or a two dimensional array.

In some forms of the invention, the first image portion, the second image portion, the third image portion and the fourth image portion are printed by the same tool. That is, the opacifying elements and design elements may be printed using the same cylinder that is used to print the micro-image elements. This has the benefit of reducing tooling costs.

BRIEF DESCRIPTION OF DRAWINGS

Embodiments will now be described with reference to the accompanying drawings. It is to be understood that the embodiments are given by way of illustration only and the invention is not limited by this illustration. In the drawings.

DETAILED DESCRIPTION

Figure 1:
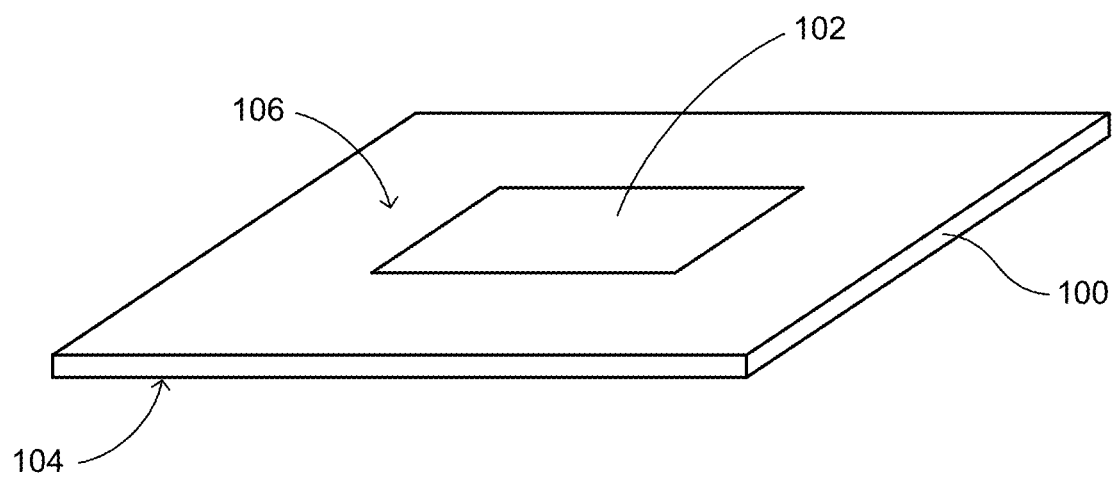
FIG. 1 shows a security element formed on a substrate.

As used herein the term security document includes all types of documents and tokens of value and identification documents including, but not limited to the following: items of currency such as banknotes and coins, credit cards, cheques, passports, identity cards, securities and share certificates, driver's licenses, deeds of title, travel documents such as airline and train tickets, entrance cards and tickets, birth, death and marriage certificates, and academic transcripts.

The invention is particularly, but not exclusively, applicable to security documents such as banknotes or identification documents such as identity cards or passports formed from a substrate to which one or more layers of printing are applied. The diffraction gratings and optically variable devices described herein may also have application in other products, such as packaging.

As used herein, the term substrate refers to the base material from which the security document or token is formed. The base material may be paper or other fibrous material such as cellulose; a plastic or polymeric material including but not limited to polypropylene (PP), polyethylene (PE), polycarbonate (PC), polyvinyl chloride (PVC), polyethylene terephthalate (PET); or a composite material of two or more materials, such as a laminate of paper and at least one plastic material, or of two or more polymeric materials.

The use of plastic or polymeric materials in the manufacture of security documents pioneered in Australia has been very successful because polymeric banknotes are more durable than their paper counterparts and can also incorporate new security devices and features. One particularly successful security feature in polymeric banknotes produced for Australia and other countries has been a transparent area or "window".

As used herein the term window refers to a transparent or translucent area in the security document compared to the substantially opaque region to which printing is applied. The window may be fully transparent so that it allows the transmission of light substantially unaffected, or it may be partly transparent or translucent partially allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting at least one opacifying layer in the region forming the window area. If opacifying layers are applied to both sides of a transparent substrate a fully transparent window may be formed by omitting the opacifying layers on both sides of the transparent substrate in the window area.

A partly transparent or translucent area, hereinafter referred to as a "half-window," may be formed in a polymeric security document which has opacifying layers on both sides by omitting the opacifying layers on one side only of the security document in the window area so that the "half-window" is not fully transparent, but allows some light to pass through without allowing objects to be viewed clearly through the half-window.

Alternatively, it is possible for the substrates to be formed from a substantially opaque material, such as paper or fibrous material, with an insert of transparent plastics material inserted into a cut-out, or recess in the paper or fibrous substrate to form a transparent window or a translucent half-window area.

One or more opacifying layers may be applied to a transparent substrate to increase the opacity of the security document. An opacifying layer is such that LT<L0 where L0 is the amount of light incident on the document, and LT is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

As used herein the term security device or feature includes any one of a large number of security devices, elements or features intended to protect the security document or token from counterfeiting, copying, alteration or tampering. Security devices or features may be provided in or on the substrate of the security document or in or on one or more layers applied to the base substrate, and may take a wide variety of forms, such as security threads embedded in layers of the security document; security inks such as fluorescent, luminescent and phosphorescent inks, metallic inks, iridescent inks, photochromic, thermochromic, hydrochromic or piezochromic inks; printed and embossed features, including relief structures; interference layers; liquid crystal devices; lenses and lenticular structures; optically variable devices (OVDs) such as diffractive devices including diffraction gratings, holograms and diffractive optical elements (DOEs).

Referring firstly to FIG. 1, there is shown a security element 102 formed on or in a substrate 100. In the illustrated embodiment, the substrate 100 together with the security element 102 form a security document, such as for example, a bank note. The security element 102 may be formed as a separate element to the substrate 100, allowing it to be applied to the substrate, or other security article, or may be formed integrally therewith.

The substrate 100 has a viewing side 104 and an opposing printing side 106. The viewing side 104 of the substrate 100 is the side from which the security element 102 will preferentially be observed. The printing side 106 may be substantially observable through the substrate 100 from the viewing side 104. For example, an opacifying layer may be applied to the viewing side 104 except in one or more specified areas to create a window or half-window on the substrate 100. Generally, some types image elements forming the security element 102 will be observable from both the viewing side 104 and the printing side 106 of the substrate 100. However, other types of image elements, such as micro-image elements, which are intended to be observed through a plurality of focussing elements disposed on or in the viewing side 104 of the substrate 100, will correspondingly be best observed from the viewing side.

In accordance with the present invention, the security element 102 includes first and second image portions (not shown in FIG. 1), each image portion being provided on the printing side 106 of the substrate 100. The image portions are typically applied to the substrate 100 as a layer of ink using a rotary printing process such as gravure, offset or flexographic printing. The first image portion includes one or more micro-image elements. Focussing elements are provided on or in the viewing side of the substrate for observing the micro-image elements. The focussing elements may comprise a one dimensional array or a two dimensional array of micro-lenses or similar focussing elements. When observed from the viewing side 104, the first and second image portions are integrated into at least one distinguishable security element. This will be more clearly understood by reference to a series of examples depicted in FIGS. 2A to 2G, FIGS. 3A to 3N and FIGS. 4A to 4D as described below.

Figure 2A:
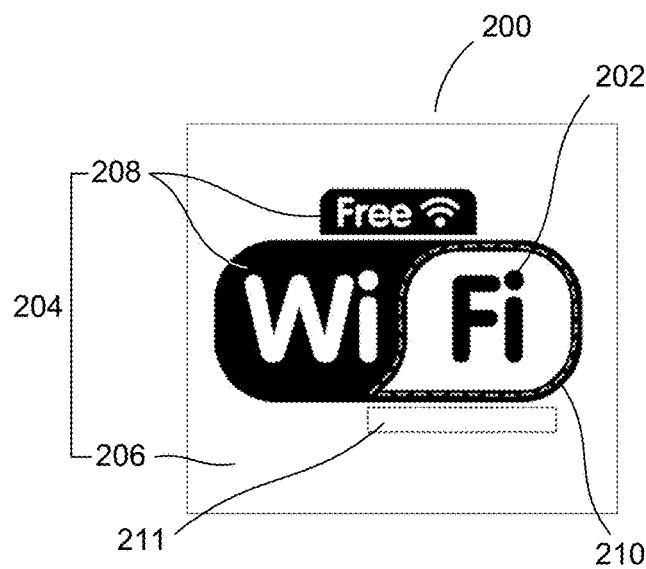
FIG. 2A shows a security element according to one embodiment.

Referring now to FIG. 2A, there is shown a security element 200 according to an embodiment of the present invention. The security element 200 includes an image layer comprising a layer of ink printed on the printing side 106 of the substrate 100 (see FIG. 1). The security element 200 includes first and second image portions, wherein the first image portion 202 includes micro-image elements and the second image portion 204 includes opacifying 206 and/or design layers 208.

When observed from the viewing side 104 of the substrate 100 which includes a plurality of focusing elements for observing the micro-image elements, the first and second image portions 202 and 204 are perceived as integral elements of a single distinguishable security element or design. The dashed line 210 represents the bounds or perimeter of the plurality of focussing elements that are disposed on or in the viewing side 104 of the substrate 100. This region 210 corresponds substantially to the extent of the first image portion 202 described with reference to FIG. 2B below. In some embodiments, the region 210, defining the extent of the lenses, extends beyond the extent of the first image portion, and may do so significantly, i.e. the lens extent can optionally be larger.

The first and second image portions may be printed using the same tooling, e.g. a rotary printing tool such as a gravure cylinder or similar. That is, the opacifying elements and design elements may be printed using the same cylinder that is used to print the micro-image elements. This has the benefit of reducing tooling costs. Staggering or alternating the order in which the image elements are printed can be employed to ameliorate printing defects such as feathering or similar undesirable distortions. That is, in FIG. 2A, a region 211 represents an area of the opacifying element that is in close proximity to micro-image elements. Therefore, the opacifying element is printed first to avoid print distortions.

Figure 2B:
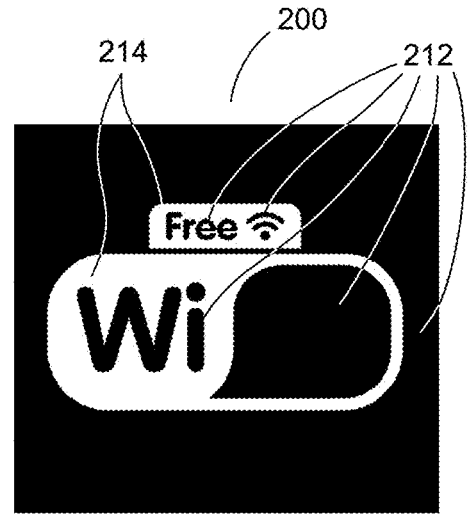
FIG. 2B shows the security element of FIG. 2A broken down into printed and non-printed areas.

Referring now to FIG. 2B, there is shown the security element 200 of FIG. 2A broken down into printed and non-printed areas. That is, the black areas 212 in FIG. 2B represent those areas of the design that are printed in white ink. These printed areas comprise a first image portion 202 printed in white ink in a window area of the substrate 100 to implement a black-to-white contrast switch as will become more apparent from the subsequent Figures. A second image portion 204 comprising an opacifying element 206, in this case a contiguous swatch of ink, and a design element 208 in this case the "Free" and "Wi" elements of the security element 200. Both the first image portion 202 and the second image portion 204 are printed in white ink. It will be understood that in a practical implementation of the security element 200, the first image portion 202 will not be 100% covered in ink since unprinted gaps will exist between the micro-image elements. The areas shown in white 214 in FIG. 2B represent the unprinted or light transmissive regions of the overall design.

It will be appreciate that in other examples, the first image portion including micro-image elements might implement other optically variable effects such as an image flip, an animation effect, a magnified moiré image, an integral image or an interlaced image.

Figure 2C:
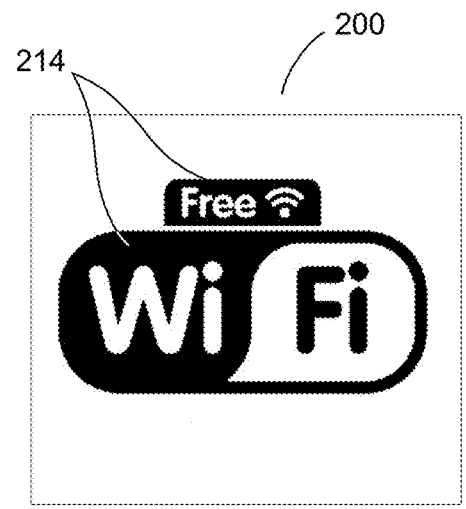
FIG. 2C shows the security element of FIG. 2A observed from the viewing side of the substrate at a first viewing angle.
Figure 2D:
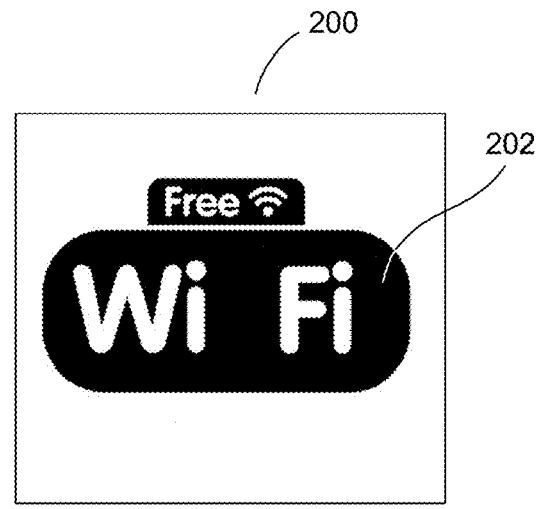
FIG. 2D shows the security element of FIG. 2A observed from the viewing side of the substrate at a second viewing angle.

Referring now to FIG. 2C, there is shown the security element observed from the viewing side 104 in reflected light at a first angle of observation. The areas represented in black 214, are those areas that reflect minimal light back to the observer, that is, the unprinted or light transmissive regions shown in white in the previous FIG. 2B. Referring now to FIG. 2D, there is shown the security element 200, with first image portion 202 observed through the focussing elements from the viewing side 104 in reflected light at a second angle of observation. Shifting between the first and second viewing angles enables the contrast switch of the "Fi" element corresponding to the first image portion 202 to be observed.

Figure 2E:
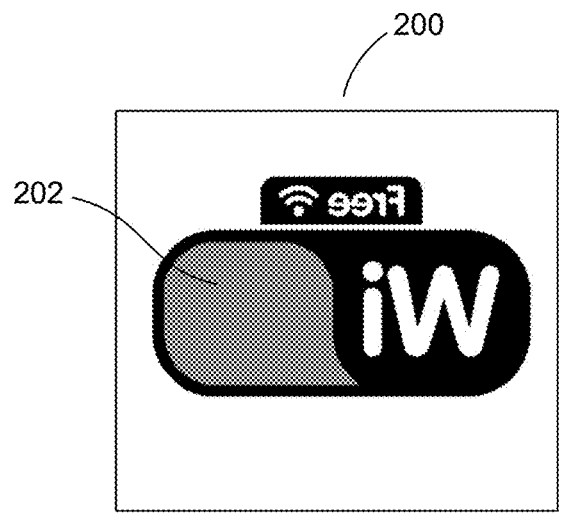
FIG. 2E shows the security element of FIG. 2A observed from the printing side of the substrate.

Referring now to FIG. 2E, there is shown the security element 200 with first image portion 202 observed from the reverse or printing side 106, that is, not through the focussing elements. In this case, the micro-image elements 202 that implement the contrast switch when viewed through the focussing elements and moving the security element between a first and second angle of observation, appear as a substantially uniform layer of grey. This is a consequence of the contrast switch design implementing one line image element and one line image element gap per lens, so that X % of the area is printed and (100–X) % is unprinted. Therefore the first image portion 202 is perceived in a uniform grey tone as opposed to solid black. Solid black would imply that 100% of the area was printed.

Figure 2F:
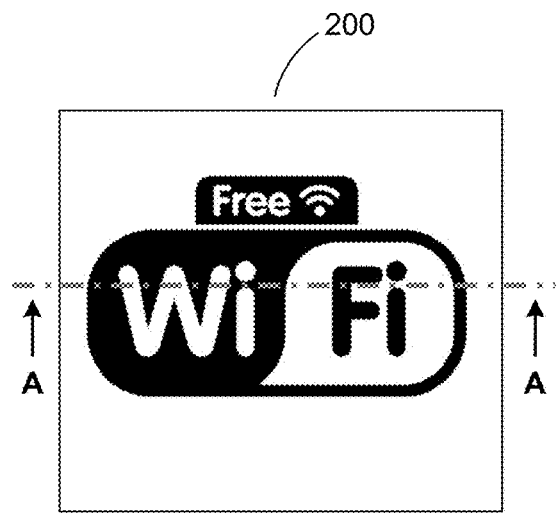
FIGS. 2F and 2G show a cross sectional view of the security element of FIG. 2A.
Figure 2G:
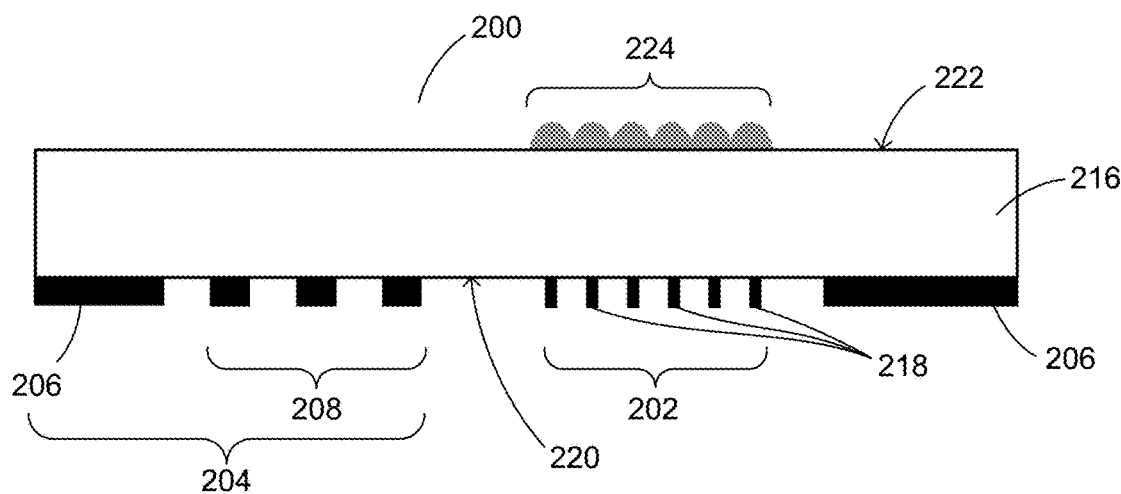

Referring now to FIG. 2F there is shown the position of cross-section AA through security element 200. FIG. 2G shows a cross sectional view of the security element 200. The security element is formed on a substrate 216 by providing a first image portion 202 including one or more micro-image elements 218 on the printing side of the substrate 220, and providing a second image portion 204 comprising an opacifiying element 206 and a design element 208, on the printing side 220 and/or the viewing side 222 of the substrate 216. Focussing elements in the form of micro lenses 224 are provided on the viewing side 222. When observed from the viewing side 222, through the lenses 224, the first image portion 202 and second image portion 204 are perceived as being integrated into a single distinguishable design 200, i.e. forming respective elements of the "Free WiFi" device.

It will be understood from the foregoing examples that the present invention provides an increased level of design integration for micro-imagery printed using rotary printing techniques. This serves to significantly increase the complexity of the design and correspondingly, the amount of effort that a counterfeiter must go to, in order to successfully replicate the security element.

Integration of the first and second image portions, i.e. the micro-image elements and the opacifying and/or design elements, further means that they may be printed by the same gravure cylinder, or similar. This may reduce the cost of production, since a single cylinder can be used to print each of the image elements featured in a single design.

Figure 3A:
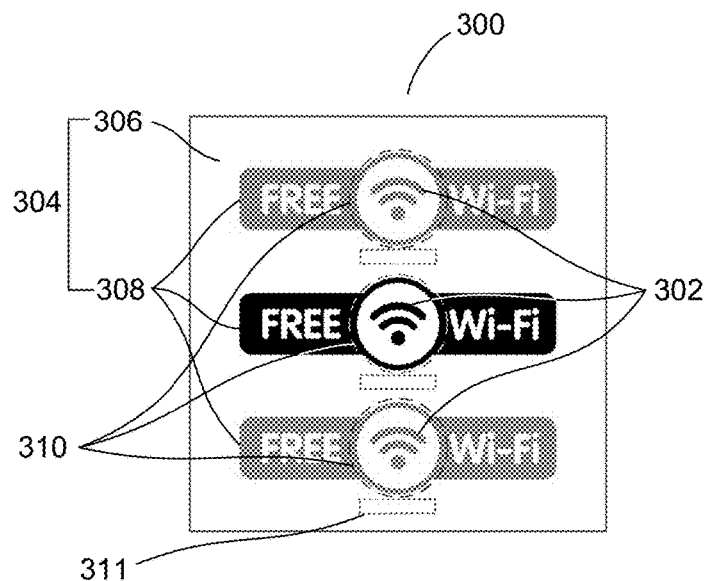
FIG. 3A shows a security element according to another embodiment.

Referring now to FIG. 3A, there is shown a security element 300 according to another embodiment of the present invention. The security element 300 includes an image layer comprising a layer of ink printed on the printing side 106 of the substrate 100 (see FIG. 1). The security element 300 includes first and second image portions, wherein the first image portion 302 includes micro-image elements and the second image portion 304 includes opacifying 306 and/or design layers 308. When observed from the viewing side 104 of the substrate 100 which includes a plurality of focusing elements for observing the micro-image elements, the first and second image portions 302 and 304 are perceived as integral elements of a single distinguishable security element or design. The dashed line 310 represents the bounds or perimeter of the plurality of focussing elements that are disposed on or in the viewing side 104 of the substrate 100. This region 310 corresponds substantially to the extent of the first image portion 302 described with reference to FIG. 3C below. The region 311 represents an area of the opacifying element that is in close proximity to micro-image elements. Therefore, the opacifying element is printed first to avoid print distortions.

Figure 3B:
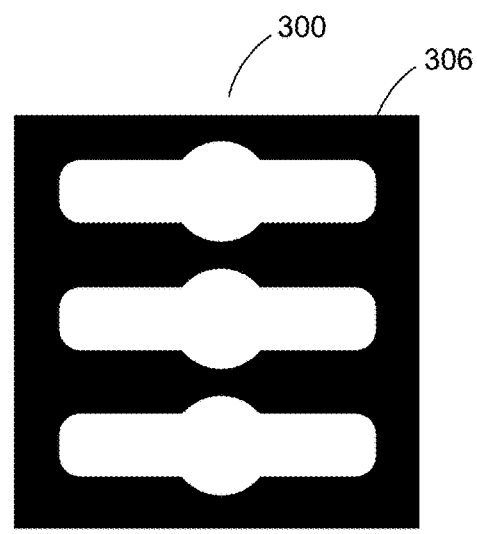
FIG. 3B shows the opacifying imagery of the security element of FIG. 3A.
Figure 3C:
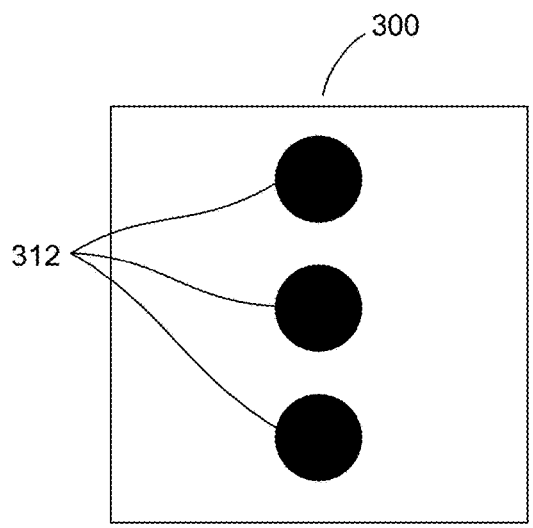
FIG. 3C shows the micro-imagery of the security element of FIG. 3A.
Figure 3D:
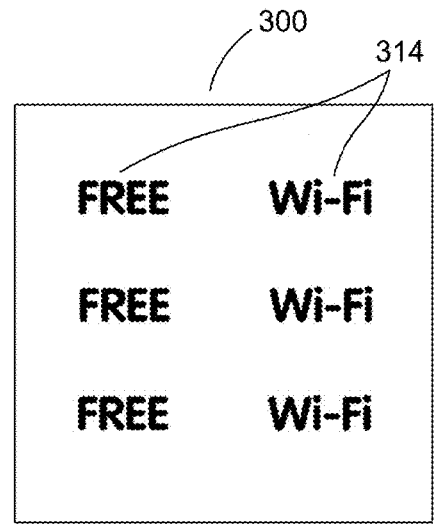
FIG. 3D shows the design imagery in a first image layer of the security element of FIG. 3A.

Referring now to FIG. 3B, there is shown the security element 300 of FIG. 3A broken down into printed and non-printed areas. That is, the black areas 306 in FIG. 3B represent the opacifying elements of the design that are printed in white ink. These opacifying areas 306 comprise part of the second image portion 304 (see FIG. 3A). Referring now to FIG. 3C, there is shown represented as black areas 312, the first image portion comprising the micro-image elements of the design. These black areas 312 are also printed in white ink and are preferably printed with the same printing tool or roller, as the opacifying elements described with reference to FIG. 3B. However, as described with reference to FIG. 2B, it will be appreciated that in a practical implementation of the security element 300, the first image portion 312 will not be 100% covered in ink since unprinted gaps will exist between the micro-image elements. Referring now to FIG. 3D, there are represented in black, the design elements 314, which comprise the second image portion 304 together with the opacifying elements 306, shown in FIG. 3B. In this case, the design elements 314, spell the terms "Free Wi-Fi". These black areas are also printed in white ink and are preferably printed with the same printing tool or roller, as the opacifying elements 306 described with reference to FIG. 3B and the micro-image elements 312 described with reference to FIG. 3C.

Figure 3E:
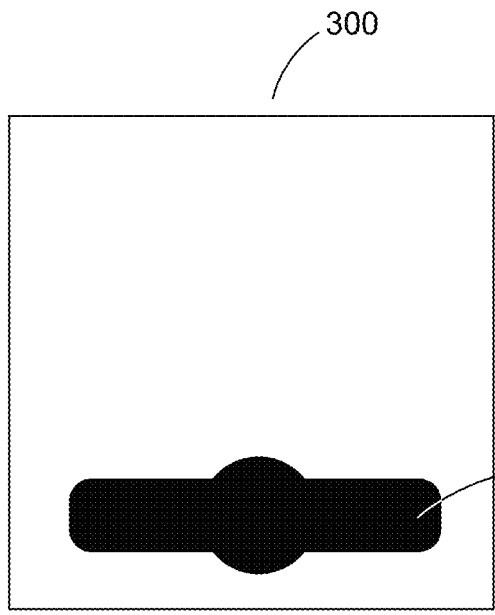
FIG. 3E shows the design imagery in a second image layer of the security element of FIG. 3A.
Figure 3F:
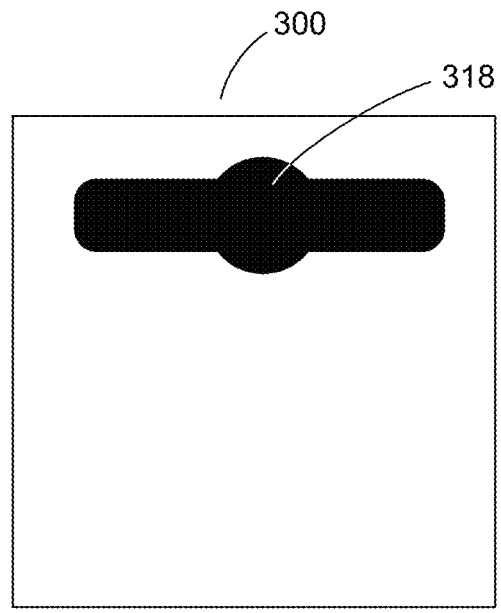
FIG. 3F shows the design imagery in a third image layer of the security element of FIG. 3A.

It will be understood that the opacifying element 306, micro-image elements 312 and design elements 314, together form a first image layer. Referring now to FIG. 3E, there is shown a further design element 316 that forms part of a second image layer. Similarly to the first image layer described with reference to FIGS. 3B to 3D, the second image layer may be comprised of third and fourth image portions, wherein the third image portion includes further micro-image elements and the fourth image portion includes further opacifying elements and/or design elements 316. In this case the design element 316 is printed in a further colour, e.g. blue. Referring now to FIG. 3F, there is shown yet another design element 318 which might be printed in another contrasting colour, e.g. orange.

Figure 3G:
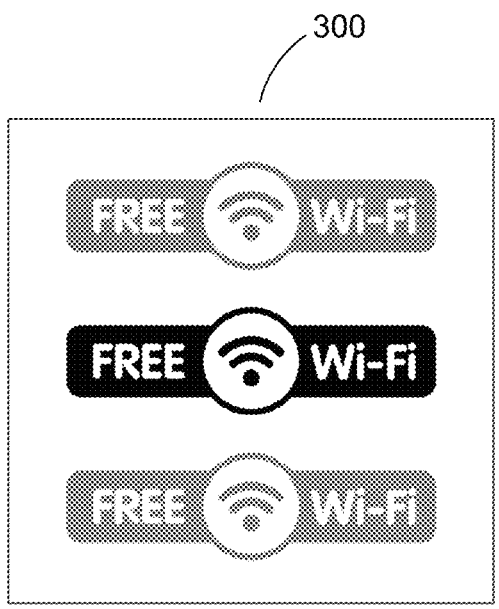
FIG. 3G shows the security element of FIG. 3A observed from the viewing side of the substrate at a first viewing angle.
Figure 3H:
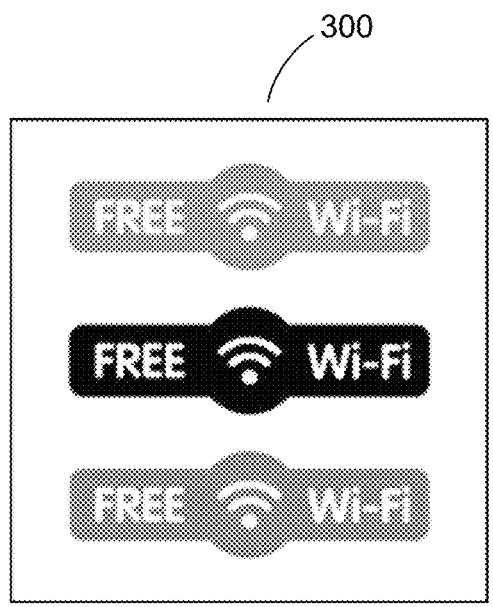
FIG. 3H shows the security element of FIG. 3A observed from the viewing side of the substrate at a second viewing angle.

Referring now to FIG. 3G, there is shown the security element 300 observed from the viewing side 104 in reflected light at a first angle of observation. Due to the second image layer described with reference to FIGS. 3E and 3F, the "Free Wi-Fi" devices are perceived in three contrasting colours, e.g. from top to bottom, in orange, black and blue. Referring now to FIG. 3H, there is shown the security element 300 observed through the focussing elements from the viewing side 104 in reflected light at a second angle of observation. Shifting between the first and second viewing angles enables the contrast switch of the central symbol (the WiFi symbol) to be observed.

Figure 3J:
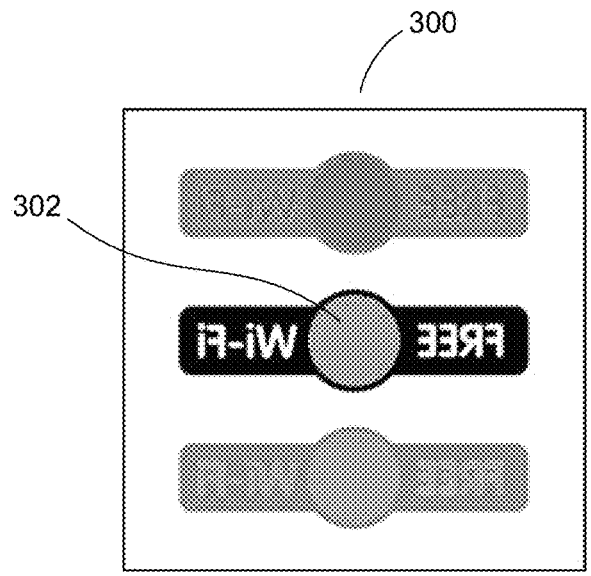
FIG. 3J shows the security element of FIG. 3A observed from the printing side of the substrate in reflected light.

Referring now to FIG. 3J, there is shown the security element 300 as observed from the reverse or printing side 106, i.e. not through the focussing elements. In this case, the first image layer design elements 314 (as shown in FIG. 3D), will be largely obscured by the second image layer design element 316 (as shown in FIG. 3E) and the third image layer design element 318 (as shown in FIG. 3F), that is, in those regions where the second image layer is printed over the first image layer. Where they are not over printed with a further image layer, the micro-image elements 302 that implement the contrast switch when viewed through the focussing elements and moving the security element between a first and second angle of observation, appear as a substantially uniform layer of grey as described in relation to the embodiment described with reference to FIGS. 2A to 2G.

Figure 3K:
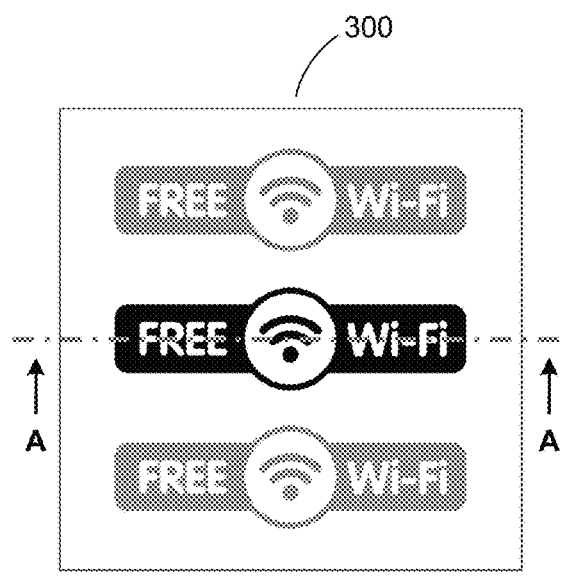
FIGS. 3K and 3L show a first cross sectional view of the security element of FIG. 3A.
Figure 3L:
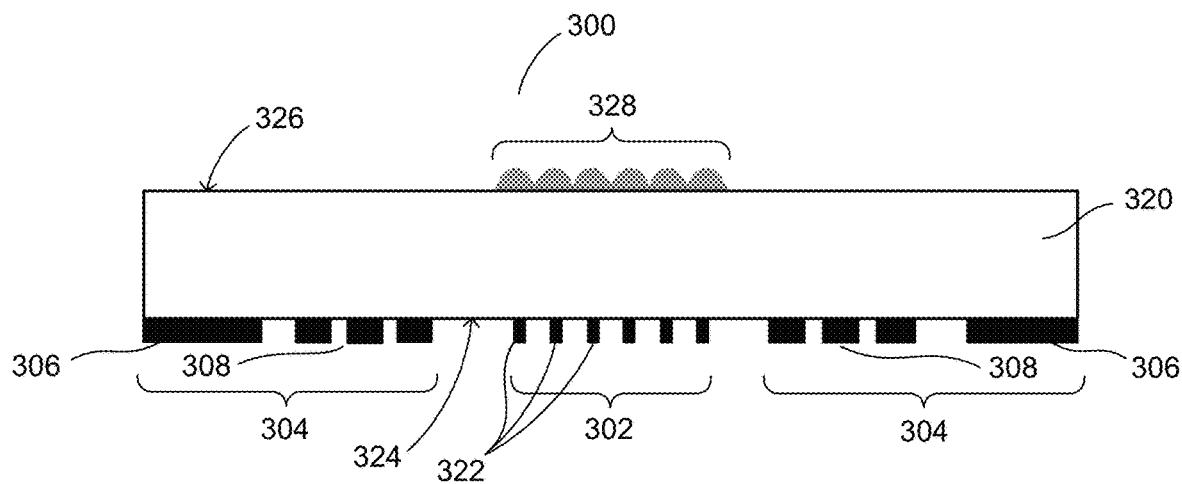

Referring now to FIG. 3K, there is shown the position of cross-section AA through security element 300. FIG. 3L shows a cross sectional view of the middle security element 300. The security element is formed on a substrate 320 by providing a first image portion 302 including one or more micro-image elements 322 on the printing side of the substrate 324, and providing a second image portion 304 comprising an opacifiying element 306 and a design element 308, on the printing side 324 and/or on the viewing side 326 of the substrate 320. Focussing elements in the form of micro lenses 328 are provided on the viewing side 326 of the substrate. When observed from the viewing side 326 of the substrate 320, through the lenses 328, the first image portion 302 and second image portion 304 are perceived as being integrated into a single distinguishable design 300, i.e. forming respective elements of the three "Free WiFi" devices.

Figure 3M:
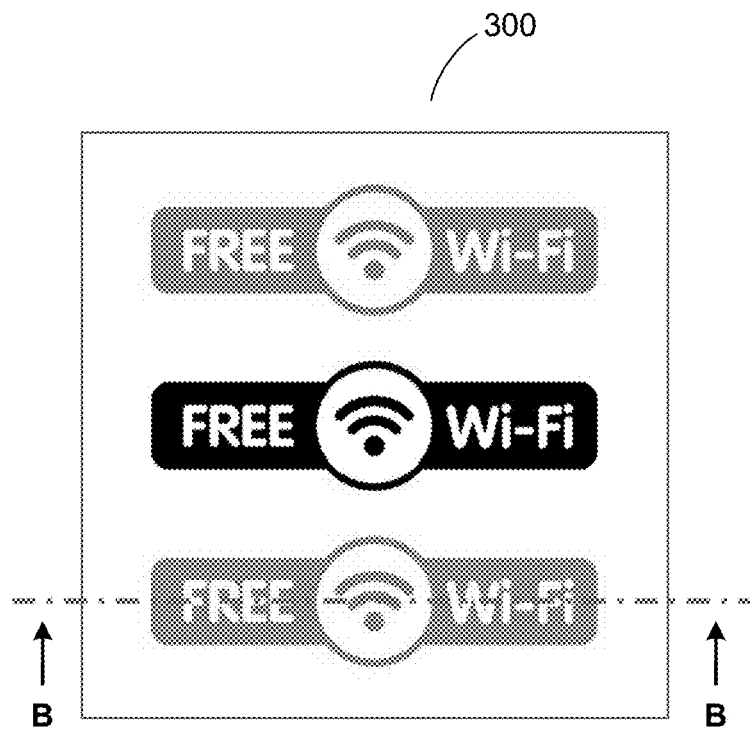
FIGS. 3M and 3N show a second cross sectional view of the security element of FIG. 3A.
Figure 3N:
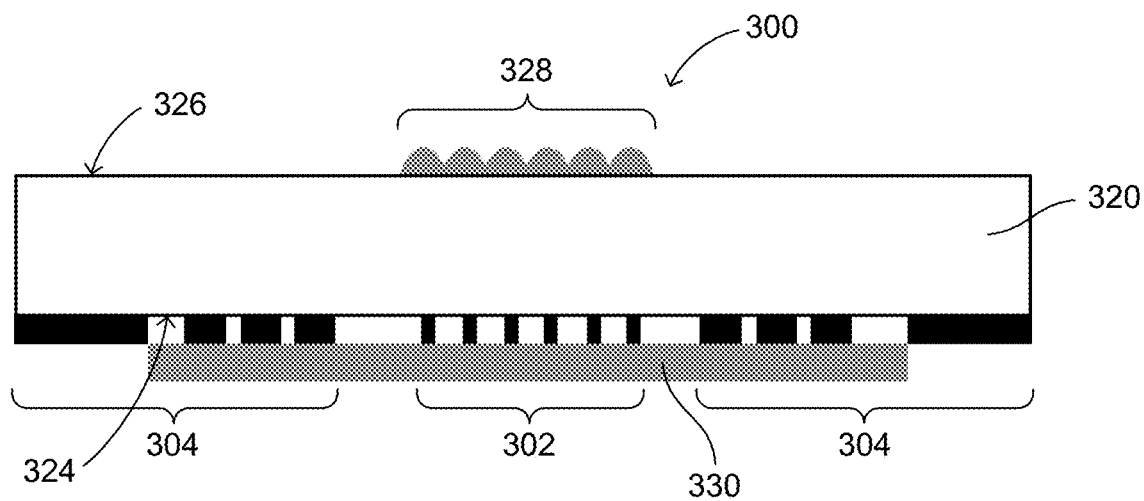

Whilst section AA passes through the middle "Free WiFi" device which has not been overprinted with a second image layer, we refer now to FIG. 3M, which shows the position of cross-section BB through the bottom security element. FIG. 3N shows a cross sectional view of the bottom security element. The security element is formed on a substrate 320 by providing a first image portion 302 on the printing side of the substrate 324 and a second image portion 304 on the printing side 324 and/or on the viewing side 326 of the substrate 320. Focussing elements in the form of micro lenses 328 are provided on the viewing side 326 of the substrate. Furthermore, the micro-image elements and the design elements are overprinted with a second image layer or design element 330. This additional design element 330 will tend to obscure the micro-image elements 302 and design elements 308 in the first image layer, when observed from the printing side of the substrate as described with reference to FIG. 3J. However, when observed from the viewing side 326 of the substrate 320, the first image portion 302, second image portion 304 and the further design elements comprising the second image layer, are all perceived as being integrated into a single distinguishable design 300, i.e. forming respective elements of the three "Free WiFi" devices, thereby forming a complex security device that is difficult to replicate.

Moreover, such integrated security element designs enable additional colour elements to be introduced into an optically variable image, using standard, and therefore low cost tooling, for example, that is not suitable for printing micro-image elements. This functionality provides significant savings in production of more complex security elements. That is, micro-image elements have been produced in three colours in the foregoing example, simply by over printing the micro-image elements with a second and a third contrasting colour. A significant benefit of this approach is that precise colour-to-colour registration is achieved automatically by printing with a single tool.

Figure 4A:
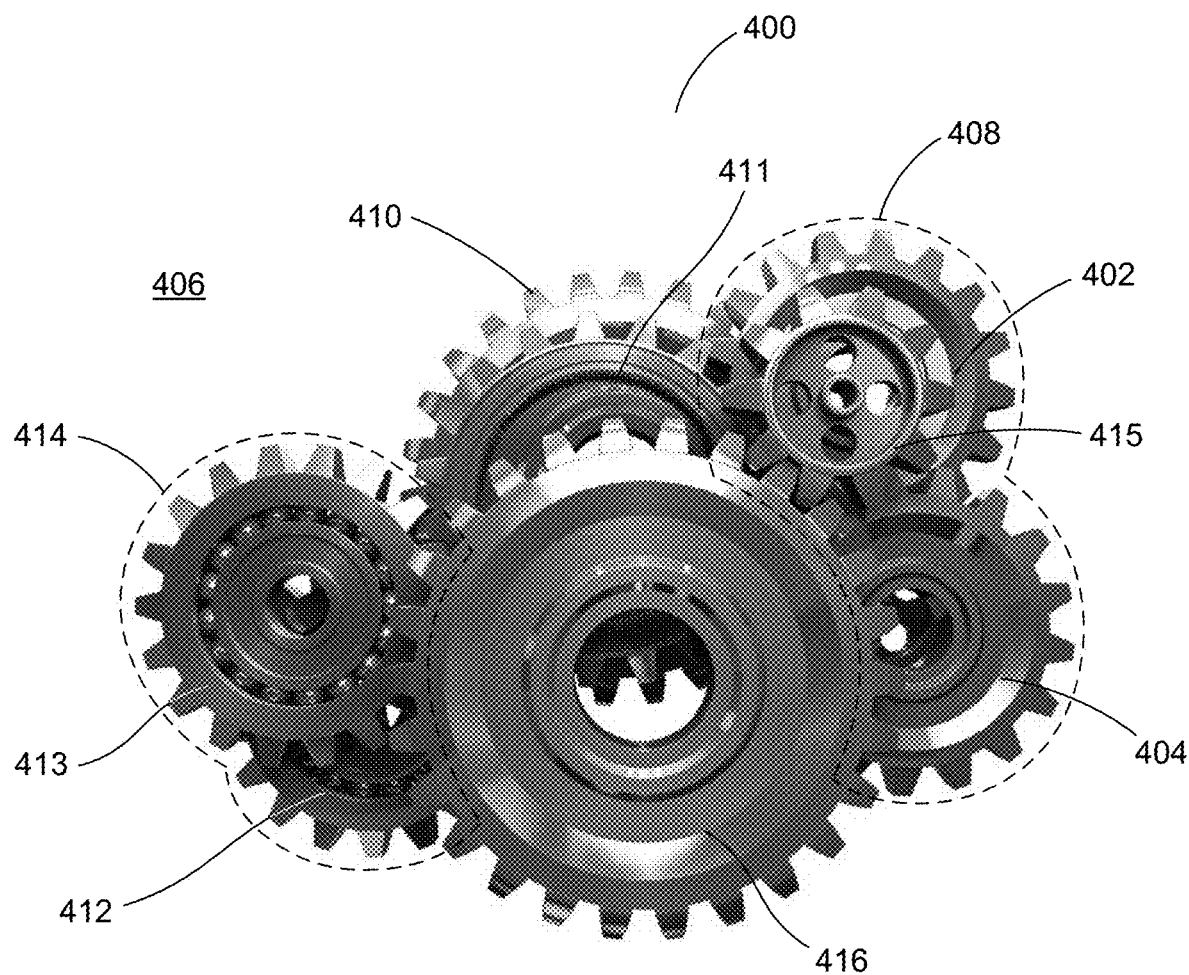
FIG. 4A shows a security element according to yet another embodiment.

Referring now to FIG. 4A, there is shown a complex device showing a number of gear wheels including some with animation effects, designed in accordance with the principles of the present invention. A first image layer includes a first image portion comprising micro-image elements consisting of two gear wheels 402, 404 printed on the printing side of a substrate as a negative image in white ink in a full window. These micro-image elements 402, 404, when observed through focusing elements disposed on the viewing side of the same substrate, at various viewing angles, implement a gear wheel animation effect. The dashed line 408 represents the extremity of the region on which an array of focussing elements is disposed on the viewing side of the substrate.

The first image layer further includes a second image portion comprising an opacifying element 406 in the form of a solid swatch of printed white ink, i.e., the background to the gear wheels. The second image portion additionally comprises two design elements 410, 411 representing a further two gear wheels. The design elements 410, 411 are printed as a halftone negative dithered binary image in white ink. Consequently, unprinted areas will be perceived as black in reflected light.

A second image layer comprising third and fourth image portions completes the security element design. The third image portion comprises a second micro-imagery layer consisting of two gear wheels 412, 413 printed on the substrate as a positive dithered binary image in red ink in a half window. Consequently unprinted areas will appear white in reflected light. These micro-image elements, when observed through focusing elements disposed on the viewing side of the same substrate, at various viewing angles, implement a gear wheel animation effect. The dashed line 414 represents the extremity of the region on which an array of focussing elements is disposed on the viewing side of the substrate. The opacifying element 406 in the first image layer overprints the micro-imagery in the second image layer. That is, the second image layer is printed before the first image layer in this example.

The fourth image portion comprises further design elements consisting of two gear wheels 415, 416 printed as a halftone positive dithered binary image in red ink. Consequently unprinted areas will appear white in reflected light. The opacifying element 406 in the first image layer overprints the design element in the second image layer.

Figure 4B:
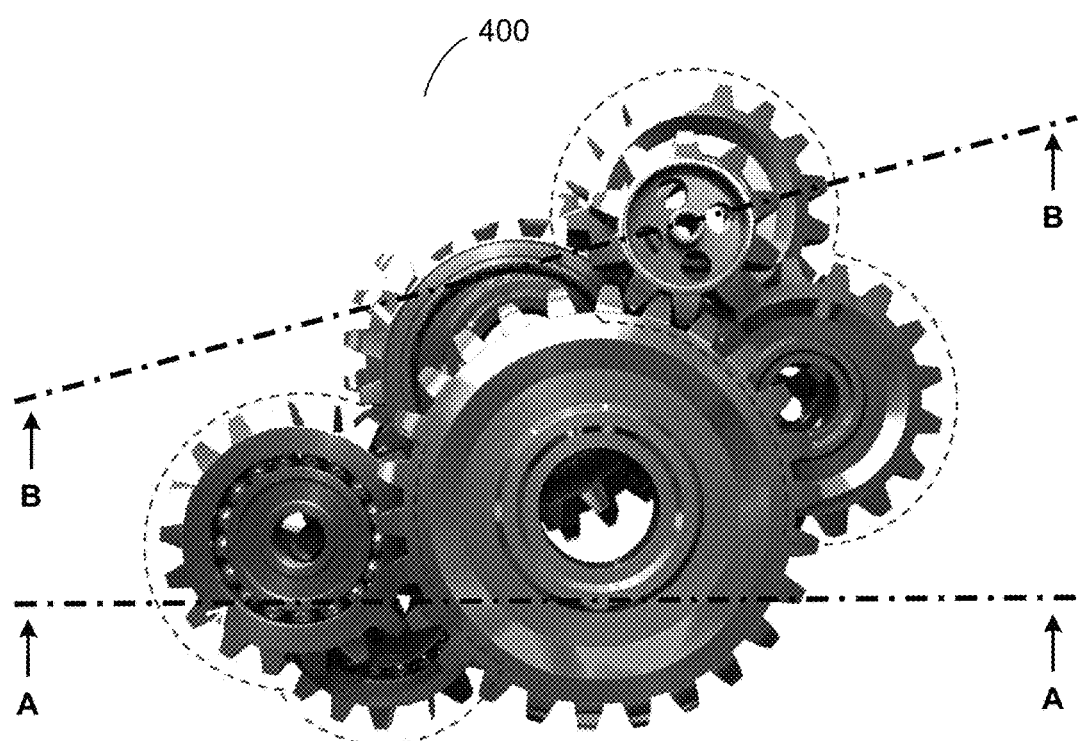
FIG. 4B shows the position of cross sections AA shown in FIG. 4C and BB shown in FIG. 4D.
Figure 4C:
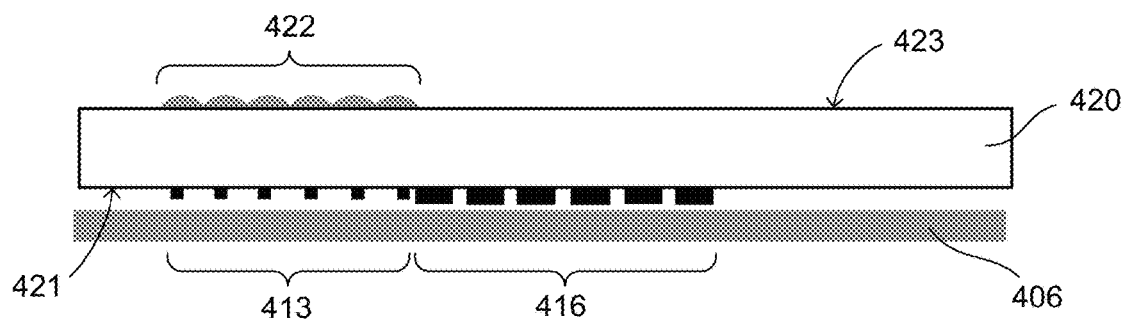
FIG. 4C shows a first cross-sectional view AA of the security element of FIG. 4A.

Referring now to FIG. 4B, there is shown the position of cross-sections AA and BB through security element 400. FIG. 4C shows cross section AA. The security element 400 is formed on a substrate 420 by providing a second image layer including micro-image elements 413 and design elements 416 both printed on the substrate 420 in red ink. Focussing elements in the form of micro lenses 422 are provided on the viewing side 423 of the substrate.

Figure 4D:
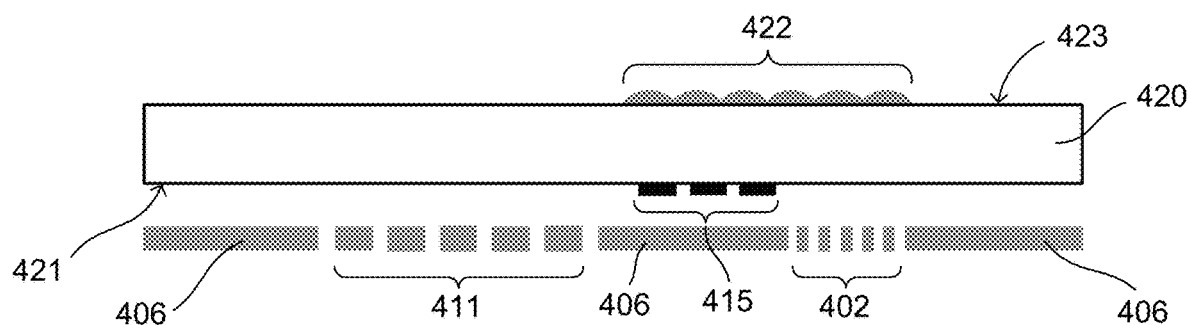
FIG. 4D shows a second cross-sectional view BB of the security element of FIG. 4A.

FIG. 4D shows cross section BB. The security element 400 is formed on a substrate 420 by providing a first image layer (printed over the second image layer in this case), comprising micro-image elements 402, an opacifiying element 406 and a design element 411, on the substrate 420. The cross section BB also includes part of the second image layer, i.e. design elements 415 printed in red ink.

The first and second image layers are observed together from the viewing side of the substrate through the focussing elements in reflected light to give rise to a single distinguishable design. In this example, the second image layer is printed in red ink, and is printed before the first image layer, which is subsequently printed in white ink. The resulting security element produces optically variable effects in two colours, integrated into a single, complex distinguishable design. The opacifying element is white and overprints the red micro-image elements in the second image layer, producing one white optically variable image in a full window and one red optically variable image in a half window.

The opacifying elements include portions that are printed in close proximity to, and prior to, micro-image elements in the first image layer. Additionally, the design elements in the second image layer include portions that are in close proximity to, and that are printed prior to, the micro-imagery in the second image layer. This approach ameliorates feathering defects in micro-imagery applied in a rotary printing process.

In producing the example described by reference to FIGS. 4A to 4D, the second image layer micro-image elements are printed first in a darker colour (e.g. red), and then overprinted in a strongly contrasting light colour (e.g. white), thereby forming a half window. This has the effect of increasing the contrast of the (in this case red) optically variable effect, since the light colour of the overprint appears to increase the colour strength of the micro-image elements thereby providing greater image contrast. By comparison, in the example described by reference to FIG. 3A to 3N, the micro-image elements are printed in a light colour first, then overprinted with a darker colour. In that case, the darker colour causes the colour of the micro-image elements to become darker, thus reducing the maximum brightness in the resulting image, thereby reducing the image contrast.

It is an advantage of the present invention, that the counterfeit resistance of security devices may be enhanced by increasing the complexity of security devices through design integration as described herein. Moreover, it is possible to implement multi-coloured optically variable effects as part of an integral design with reduced tooling costs.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

What is claimed is:

1. A security element formed on a substrate having a printing side and a viewing side, the security element including:
   a first image portion provided on the printing side of the substrate, the first image portion including one or more micro-image elements;
   a second image portion provided on the printing side of the substrate and substantially adjacent to the first image portion, the second image portion including at least one design element, and the at least one design element comprising a portion of ink deposited on the substrate so as to be discernible as an image or a graphic; and
   a plurality of focussing elements disposed on or in the viewing side of the substrate opposite the micro-image elements of the first image portion, the focussing elements configured for observing the one or more micro-image elements;
   wherein the first image portion and the second image portion are integrated into at least one distinguishable security element when observed from the viewing side of the substrate,
   wherein at least a section of the viewing side of the substrate opposite the second image portion is absent the focussing elements such that when viewed from the viewing side the second image portion opposite the section is not observed through the focussing elements,
   wherein at least part of the second image portion is printed over at least part of the first image portion.

2. The security element of claim 1, wherein the first and second image portions are printed in a colour.

3. The security element of claim 1, wherein at least part of the first image portion is provided in a window.

4. The security element of claim 1, wherein the second image portion is printed before the first image portion.

5. The security element of claim 1, wherein at least one of the first image portion or the second image portion is overprinted with a colour.

6. The security element of claim 1, wherein the first image portion and the second image portion are provided on the substrate such that they overlap in at least one region.

7. The security element of claim 6, wherein a tonal gradient is applied to the region in which the first image portion and the second image portion overlap.

8. The security element of claim 1, wherein the first image portion and the second image portion form a first image layer and the security element further includes a second image layer including a third image portion and a fourth image portion, wherein the third image portion includes one or more micro-image elements.

9. The security element of claim 8, wherein the third image portion and the fourth image portion are integrated into at least one second distinguishable security element when observed from the viewing side of the substrate.

10. The security element of claim 9, wherein the fourth image portion includes at least one opacifying element and/or at least one design element.

11. The security element of claim 9, wherein at least one of the first image portion or the second image portion is printed in a first colour and the third and fourth image portions are printed in a second colour.

12. The security element of claim 11, wherein the first and second colours are contrasting.

13. The security element of claim 9, wherein at least part of the fourth image portion is printed over at least part of the third image portion.

14. The security element of claim 9, wherein at least part of the third image portion is provided in a window.

15. The security element of claim 9, wherein the fourth image portion is provided substantially adjacent to the third image portion.

16. The security element of claim 15, wherein the fourth image portion is printed before the third image portion.

17. The security element of claim 9, wherein at least one of the third image portion or the fourth image portion is overprinted with a colour.

18. The security element of claim 17, wherein at least one of the first image portion or the second image portion is printed in a first colour, at least one of the third image portion or a fourth image portion is printed in a second colour, and at least one of the third image portion or the fourth image portion is overprinted with a third colour, wherein the first, second and third colours are contrasting.

19. The security element of claim 9, wherein the third image portion and the fourth image portion are provided on the substrate such that they overlap in at least one region.

20. The security element of claim 19, wherein a tonal gradient is applied to the region in which the third image portion and the fourth image portion overlap.

21. The security element of claim 9, wherein the first image portion, the second image portion, the third image portion and the fourth image portion are integrated into at least one third distinguishable security element when observed from the viewing side of the substrate.

22. The security element of claim 8, wherein the first image portion, the second image portion, the third image portion and the fourth image portion are printed by the same tool.

23. The security element of claim 1, wherein the micro-image elements when viewed from the viewing side through the plurality of focussing elements, implement one or more of:
a contrast switch;
an image flip;
an animation;
a magnified moiré image;
an integral image; or
an interlaced image.

24. The security element of claim 1, wherein the plurality of focusing elements includes micro lenses.

25. The security element of claim 24, wherein the micro lenses are arranged in a one dimensional or a two-dimensional array.

26. The security element of claim 1, wherein the ink is an opacifying ink.

27. The security element of claim 1, wherein the second image portion further comprises at least one opacifying element comprising a contiguous block of an opacifying layer.

28. The security element of claim 1, wherein the first image portion and the second image portion are printed by the same tool.

* * * * *